J. E. HASCHKE.
STORAGE BATTERY.
APPLICATION FILED NOV. 7, 1908.

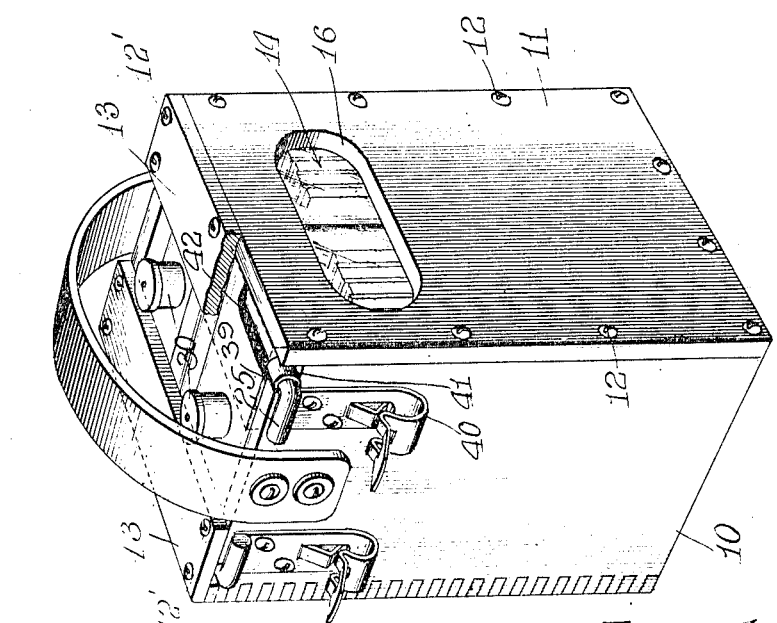

947,575.

Patented Jan. 25, 1910.
2 SHEETS—SHEET 2.

Witnesses
Harry R. Levlete
Floyd White

Inventor
Julius E. Haschke.
By Foree Bain and May
Attys

UNITED STATES PATENT OFFICE.

JULIUS E. HASCHKE, OF CHICAGO, ILLINOIS.

STORAGE BATTERY.

947,575.  Specification of Letters Patent.  Patented Jan. 25, 1910.

Application filed November 7, 1908. Serial No. 461,442.

*To all whom it may concern:*

Be it known that I, JULIUS E. HASCHKE, a citizen of the United States, residing at Chicago, in the county of Cook and State of Illinois, have invented certain new and useful Improvements in Storage Batteries, of which the following is a specification.

My invention relates to improvements in storage batteries, and more particularly to portable storage batteries, such as are commonly employed in automobile practice.

Among the objects of my invention are to provide a single or multiple-cell battery-unit set up for commercial use in a form convenient for handling, assembling and disassembling of its constituent cells, inspection of its condition without removal of any part, and structurally capable of withstanding the jars and hard usage to which such batteries are frequently subjected.

Other objects of my invention are to provide plates or elements of novel construction insuring great permeability to the electrolyte; and to provide novel construction in building up the combination of elements and containing structure, insuring efficient insulation of the positive and negative plates, adequate support of all of the plates to prevent shortcircuiting, stability of the assembled structure to withstand jars and shocks, and efficient closure of the top of each containing cell.

Figure 3:
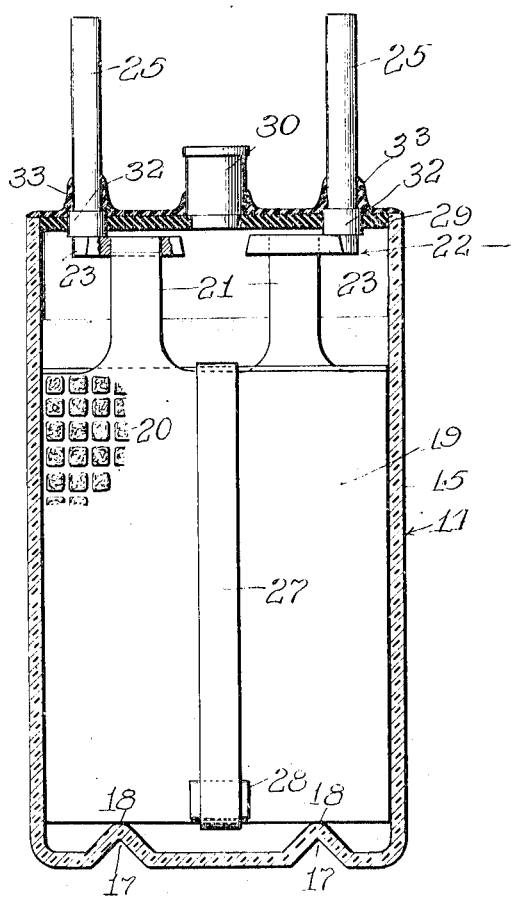
Figure 4:
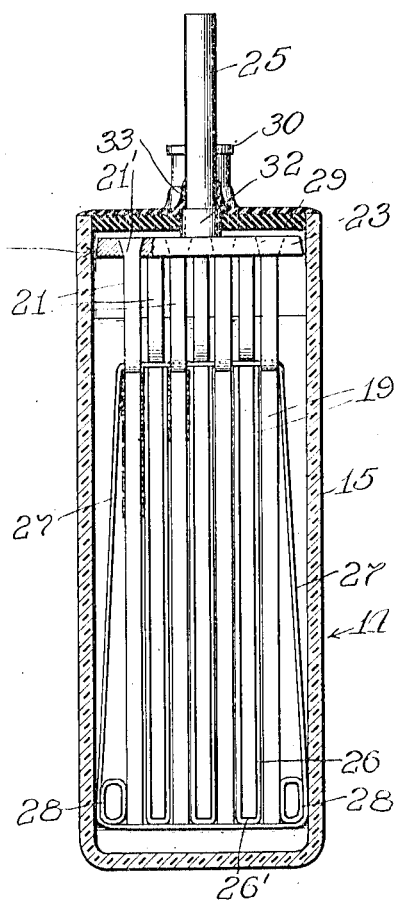
Figure 6:
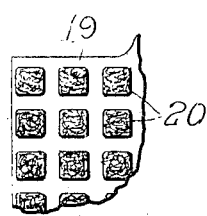
Figure 5:
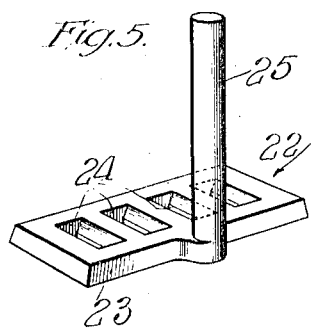
Figure 7:
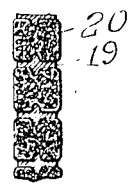

Other and further objects of my invention will become apparent to those skilled in the art from the following description taken in conjunction with the accompanying drawings, showing a practical embodiment of my invention, wherein;

Figure 1 is a perspective view of the battery complete with a part of its casing removed. Fig. 2 is a section taken just inside of the front end; Fig. 3 is a longitudinal vertical section of a cell; Fig. 4 is a transverse vertical section of a cell; and, Fig. 5 is a perspective detail of a plate connector and terminal; and Figs. 6 and 7 are plan and sectional details, enlarged, of a single plate.

It will be understood that many of the features of my invention may be applied to batteries irrespective of the number of cells employed, but it is my preference to employ multiple cell batteries, wherein several cells, suitably connected electrically, are housed in a common casing.

In the construction shown 10 indicates in general a stout casing, preferably of wood, having its bottom and three of its sides permanently connected together in suitable fashion, as by dove-tailing, and with what I will term its "front" end 11, detachably secured to the sides as by screws 12. Top slats 13 may also be provided spanning the ends of the casing to close all but the central area of the top, said slats being detachably secured in position as by screws 12'.

The cell or cells 14, whereof I preferably provide two or more in each battery, preferably have transparent glass containing jars or cups 15, in which the elements and electrolyte are contained, and to permit the condition of the various cells to be inspected at pleasure without any parts of the structure, I provide in the end wall 11 of the containing casing 10 a view aperture 16, of such size and in such position as to permit the end of every cell in the casing to be seen, at a level extending above and below the tops of the plates.

Each cell 14 has its glass jar 15 provided in its bottom with transverse corrugations in the form of exterior grooves 17 and interior projections 18, and is preferably otherwise a plain glass open-mouthed cup. Each plate 19 is preferably a metallic supporting structure—preferably of lead—of suitable thickness, having applied thereto and preferably extending therethrough from face to face bodies or buttons 20 of lead-wool suitably compacted and self-retaining in the plate, but maintaining its porosity and perviousness to the electrolyte. The material which I designate as "lead-wool" is a mass of shreds or thin strands of lead, interwoven or matted. Each such plate 19 has the customary terminal ear or projection 21 at its top edge, and the several plates which jointly constitute one element of the electric couple are preferably connected by the customary unitary terminal element 22, consisting of a bar 23 having therein downwardly tapering apertures 24 receiving the projections 21 of the respective plates which, when inserted are swaged or welded in to fill the tapered apertures 24, as best shown at 21' in Fig. 4. From the bar 23 of the terminal structure 22, projects an integral post 25, adapted to constitute part of the exterior terminal connection of the cell.

The alternate plates of the cells are insulated from the contiguous plates of opposite polarity by envelops 26 of permeable, flexible insulating material, such as chemically treated wood pulp paper, the envelop of each such plate constituting a single sheet bent centrally at 26', Fig. 4, to underlie the bottom of the plate and extending up to cover both sides thereof.

The body of plates, suitably assembled in alternate relation and insulated from each other, as described, are secured flatwise together, preferably by a rubber band 27 encircling them, and the band is also a medium for retaining in position elastic packings 28 preferably in the form of sections of rubber tubing, extending horizontally on the outermost plates, and held in position by interposition between such plates and the rubber bands 27, so as to coact with the jar and prevent lateral movement of the plates.

The assembled body of plates when placed in the cell rests upon the transverse ribs 18, so that at the bottom of the cell is left free a considerable space wherein deposits of conductive material may occur, without short-circuiting the plates.

For closing the top of each cell I provide a hard rubber plate 29, having centrally connected therewith a suitable vent 30 the detailed structure whereof forms no part of my present invention, said plates having made therein suitable apertures through which the stems 25 of the two connecting elements 22 may project. I provide upon each stem 25 a soft rubber bushing 32, which makes intimate contact with the hard rubber plate 28, so acting as a packing to prevent leakage, tending to hold the rubber plate 28 firmly and positively in its position upon the stem 25, and acting as a petticoat insulator to prevent short circuiting between the terminals should the rubber plate become coated with electrolyte. The parts of the cell heretofore described, when assembled, are completely sealed save for the vent orifice, by coating over the plate 29 and its joints with all the adjacent parts with a sealing compound, as indicated at 33. It will be observed that a cell as thus constructed is compact, well sealed, durably constructed, efficiently protected against destruction or damage by jarring, and has its several plates, which are of simple construction, easy of manufacture and of high permeability, efficiently insulated from each other by a separator arrangement which is cheap and easy of application.

In assembling the cell units 14 in their casing I provide a yielding bottom packing 35 which, for cheapness, is preferably a layer of sawdust covered with a sheet 36 of paper or the like, closely conforming to the shape of the box. When the cells 14 are seated upon the paper and pressed firmly therein, the sawdust and paper covering are forced up into the groove 17, in the under side of the cell, so tending to lock the cell against endwise displacement. Between the cells 14 I insert a relatively thin packing, 37, preferably of tar paper, and between the casing 10 and the cells 14 throughout their periphery I tightly pack a body of oakum, or other fibrous material, as indicated at 38. When the cells are in place suitable terminals 25 may be united to connect the cells in desired electrical relation, and the extreme terminals 25 are bent down, as shown in Fig. 2, and led through openings 39 in sides of the casing for connection with suitable terminal clips or binding posts 40. The holes or slots 39 in the casing may be bushed with rubber, as at 41, or the terminals otherwise insulated therefrom.

When the cells are in place they may be entirely covered over with a body 42 of sealing material, applied in a plastic state, although in some instances such a coating is not necessary. Obviously the slats 13 overlying the assembled cells prevent their vertical displacement, but at the same time leave open a central area into which project the vents 30, which are thereby left always accessible.

It will be apparent that a battery as above described is well constructed to stand rough, hard usage both in the interior or construction of the individual cells and the assembling of the cells. Furthermore the condition of the battery may be constantly observed through the view opening 16 in order that the electrolyte may be kept at proper level, sulfating of the plates observed and " boiling " of the electrolyte when the battery is fully charged may be noted.

Having described my invention, what I claim is;

1. In a storage battery, a plurality of glass cells arranged side by side, plates and electrolyte in each cell, closures for said cells, a central vent structure for each cell projecting upward from its closure, a casing for the cells providing three sides and a bottom permanently connected together, a side overlying the ends of the cells detachably connected to the permanent structure, and apertured at a level to permit of inspection of the electrolyte in the cell, and detachable top slats spanning the casing crosswise of the series of cells therein to overlie the ends of all of said cells and to leave therebetween an open area for the vent structures.

2. In a storage battery, a plurality of glass cells arranged side by side, closures therefor, a central vent structure for each cell projecting upward therefrom, a casing for the cells providing three sides and a bottom permanently connected together, a fourth side detachably connected to the permanent structure, and detachable top slats, spanning the casing crosswise of the series of cells therein, each to overlie one end of all of said cells, and to leave therebetween an open area for the vent structures.

3. In a storage battery, a plurality of transparent cells arranged side by side, terminal connections projecting from the tops of said cells laterally beyond a side of the series of cells, a wood containing casing for said cells providing a bottom and three sides permanently connected, and a fourth side detachably connected to said permanent structure, said detachable part being apertured near the level of the cell tops, and on the side of the permanent structure being notched at its top to receive the terminal connections, binding posts secured on said side, connected to the terminals, and slats overlying the ends of cells at the top thereof and covering the notches for the terminal connections.

4. In a storage battery, a containing casing, a cell structure therein, a grooved bottom and a packing interposed between the bottom of the cell and the casing soft enough to enter the grooved bottom of the cell, thereby tending to retain the cell against horizontal displacement in the casing.

5. In a storage battery, a containing casing, a cell structure therein having a bottom corrugated to provide transverse internal ribs, and external grooves, a packing between the cell and casing adapted to enter said grooves, thereby tending to retain the cell against horizontal displacement, and suitable elements constituting an electric couple within the cell, supported on the interior ribs, thereby to leave a free deposit space at the bottom of the cell between the ribs.

In testimony whereof I hereunto set my hand in the presence of two witnesses.

JULIUS E. HASCHKE.

In the presence of—
    GEO. T. MAY, Jr.,
    MARY F. ALLEN.